US012471098B2

(12) United States Patent
Huang et al.

(10) Patent No.: US 12,471,098 B2
(45) Date of Patent: *Nov. 11, 2025

(54) PHYSICAL UPLINK CONTROL CHANNEL (PUCCH) REPETITION ACROSS MULTIPLE COMPONENT CARRIERS

(71) Applicant: QUALCOMM Incorporated, San Diego, CA (US)

(72) Inventors: Yi Huang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,466

(22) Filed: Jun. 3, 2024

(65) Prior Publication Data

US 2024/0323968 A1 Sep. 26, 2024

Related U.S. Application Data

(63) Continuation of application No. 17/495,672, filed on Oct. 6, 2021, now Pat. No. 12,035,316.

(Continued)

(51) Int. Cl.
*H04W 72/21* (2023.01)
*H04L 5/00* (2006.01)
(Continued)

(52) U.S. Cl.
CPC ............ *H04W 72/21* (2023.01); *H04L 5/001* (2013.01); *H04L 27/26025* (2021.01); *H04W 72/0446* (2013.01)

(58) Field of Classification Search
CPC . H04W 72/21; H04W 72/0446; H04W 5/001; H04W 52/242; H04W 72/20;
(Continued)

(56) References Cited

U.S. PATENT DOCUMENTS 12,035,316 B2  7/2024  Huang et al.
2010/0098012 A1  4/2010  Bala et al.
(Continued)

FOREIGN PATENT DOCUMENTS

AU   2017336823 A1   2/2019
CN      107210871 A   9/2017
(Continued)

OTHER PUBLICATIONS

International Search Report and Written Opinion—PCT/US2021/054036—ISA/EPO—Jan. 26, 2022.
(Continued)

*Primary Examiner* — Mewale A Ambaye
(74) *Attorney, Agent, or Firm* — Kevin M. Donnelly; Seyfarth Shaw LLP

(57) ABSTRACT

A method of wireless communication performed by a user equipment (UE) includes receiving, from a network node, a first message configuring a group of component carriers that includes a primary component carrier and one or more secondary component carriers. The method also includes receiving, from the network node, a second message configuring a number of repetitions of a physical uplink control channel (PUCCH) transmission. The method further includes transmitting, to the network node, each repetition of the PUCCH transmission via the primary component carrier or one of the one or more secondary component carriers in accordance with the number of repetitions, each repetition being transmitted on only the primary component carrier in accordance with the number of repetitions being greater than one, and each repetition being transmitted on either the primary component carrier or the secondary component carrier in accordance with the number of repetitions being equal to one.

20 Claims, 11 Drawing Sheets

Related U.S. Application Data

(60) Provisional application No. 63/090,149, filed on Oct. 9, 2020.

(51) Int. Cl.
*H04L 27/26* (2006.01)
*H04W 72/0446* (2023.01)

(58) Field of Classification Search
CPC .. H04W 52/146; H04L 27/26025; H04L 5/00; H04L 5/0053; H04L 5/0094; H04L 1/0072
See application file for complete search history.

(56) References Cited

U.S. PATENT DOCUMENTS

| | | | |
|---|---|---|---|
| 2020/0029335 A1* | 1/2020 | Yang | H04W 52/54 |
| 2022/0085918 A1* | 3/2022 | Luo | H04L 1/18 |
| 2022/0095346 A1* | 3/2022 | Khoshnevisan | H04L 1/1854 |
| 2023/0100345 A1* | 3/2023 | Ly | H04W 72/0453 370/329 |
| 2023/0109239 A1* | 4/2023 | Elshafie | H04L 5/0048 370/329 |
| 2023/0117080 A1* | 4/2023 | Lei | H04L 5/0051 370/329 |
| 2023/0254091 A1* | 8/2023 | Elshafie | H04L 1/08 370/329 |

FOREIGN PATENT DOCUMENTS

| | | |
|---|---|---|
| CN | 113228546 A | 8/2021 |
| WO | 2020006027 A1 | 1/2020 |

OTHER PUBLICATIONS

Nokia, et al., "Summary of [91-LTE-10] Email Discussion on Candidate Techniques for LTE URLLC", R1-1801864, 3GPP TSG RAN WG1 Meeting #92, 3rd Generation Partnership Project, Mobile Competence Centre, France, vol. RAN WG1, No. Athens, Greece, Feb. 26, 2017-Mar. 2, 2017, Feb. 16, 2018, XP051397030, 26 Pages, Questions 2.1, 3.1, 3.3, 5.1, p. 14, Question 4.1, Answer Ericsson, p. 15, Question 4.1, Huawei, HiSilicon, p. 16, Question 4.3, Answer: Ericsson, p. 16, Question 4.3, Answer: LGE p. 17, Proposal 4.1, p. 15, penultimate paragraph.

Bao-Chang L., et al., "Air Interface Expenses Analysis' System of LTE", Techniques of Automation Applications, vol. 1, Jan. 25, 2011, pp. 32-36.

CATT: "Introduction of DEFLATE based UDC Solution", 3GPP TSG RAN WG2 Meeting #101bis, R2-1804566, Sanya, China, Apr. 16-20, 2018, Apr. 5, 2018, 8 Pages.

* cited by examiner

PHYSICAL UPLINK CONTROL CHANNEL (PUCCH) REPETITION ACROSS MULTIPLE COMPONENT CARRIERS

CROSS-REFERENCE TO RELATED APPLICATION

The present application is a continuation application of U.S. patent application Ser. No. 17/495,672, filed on Oct. 6, 2021, and titled "PHYSICAL UPLINK CONTROL CHANNEL (PUCCH) REPETITION ACROSS MULTIPLE COMPONENT CARRIERS," which claims the benefit of U.S. Provisional Patent Application No. 63/090,149, filed on Oct. 9, 2020, and titled "PHYSICAL UPLINK CONTROL CHANNEL (PUCCH) REPETITION ACROSS MULTIPLE COMPONENT CARRIERS," the disclosure of which is expressly incorporated by reference in its entirety.

FIELD OF THE DISCLOSURE

Aspects of the present disclosure generally relate to wireless communications, and more particularly to physical uplink control channel (PUCCH) repetition across multiple component carriers (CCs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

A base station may configure a UE with multiple component carriers (CCs). In some such examples, the UE may support UL carrier aggregation (CA) such that the base station may configure the UE to use all or a subset of the CCs for uplink transmission. The multiple CCs include a primary component carrier (PCC) and one or more secondary component carriers (SCCs). The UE may transmit various channels on the uplink, including a physical uplink control channel (PUCCH). In some examples, a base station may configure the UE to transmit a number of repetitions of a PUCCH transmission. However, telecommunications standards, such as 3GPP NR Release 15 and Release 16, specify that a PUCCH is to be transmitted on only the PCC in a PUCCH group. Current standards also specify that a PUCCH can be repeated on only the PCC.

SUMMARY

In one aspect of the present disclosure, a method for wireless communication by a user equipment (UE) is disclosed. The method includes receiving, from a base station, a repetition configuration indicating a number of repetitions of a physical uplink control channel (PUCCH) transmission including at least a first repetition and a second repetition. The method also includes transmitting, to the base station, the first repetition of the PUCCH transmission in a first slot on a first component carrier, of a group of component carriers that includes a primary component carrier and one or more secondary components carriers, based on receiving the repetition configuration. The method still further includes transmitting, to the base station, the second repetition of the PUCCH transmission on either the first component carrier or a second component carrier, of the group of component carriers, having an earliest slot, after the first slot, that is available to carry the second repetition, the second repetition being transmitted in the earliest slot.

Another aspect of the present disclosure is directed to an apparatus including means for receiving, from a base station, a repetition configuration indicating a number of repetitions of a PUCCH transmission including at least a first repetition and a second repetition. The apparatus also includes means for transmitting, to the base station, the first repetition of the PUCCH transmission in a first slot on a first component carrier, of a group of component carriers that includes a primary component carrier and one or more secondary components carriers, based on receiving the repetition configuration. The apparatus further includes means for transmitting, to the base station, the second repetition of the PUCCH transmission on either the first component carrier or a second component carrier, of the group of component carriers, having an earliest slot, after the first slot, that is available to carry the second repetition, the second repetition being transmitted in the earliest slot.

In another aspect of the present disclosure, a non-transitory computer-readable medium with non-transitory program code recorded thereon is disclosed. The program code is for wireless communication at a UE. The program code is executed by a processor and includes program code to receive, from a base station, a repetition configuration indicating a number of repetitions of a PUCCH transmission including at least a first repetition and a second repetition. The program code also includes program code to transmit, to the base station, the first repetition of the PUCCH transmission in a first slot on a first component carrier, of a group of component carriers that includes a primary component carrier and one or more secondary components carriers, based on receiving the repetition configuration. The program code further includes program code to transmit, to the base station, the second repetition of the PUCCH transmission on either the first component carrier or a second component carrier, of the group of component carriers, having an earliest slot, after the first slot, that is available to carry the second repetition, the second repetition being transmitted in the earliest slot.

Another aspect of the present disclosure is directed to an apparatus. The apparatus having a memory, one or more processors coupled to the memory, and instructions stored in the memory. The instructions being operable, when executed by the processor, to cause the apparatus to receive, from a base station, a repetition configuration indicating a number of repetitions of a PUCCH transmission including at least a first repetition and a second repetition. The instructions also cause the apparatus to transmit, to the base station, the first repetition of the PUCCH transmission in a first slot on a first component carrier, of a group of component carriers that includes a primary component carrier and one or more secondary components carriers, based on receiving the repetition configuration. The instructions additionally cause the apparatus to transmit, to the base station, the second repetition of the PUCCH transmission on either the first component carrier or a second component carrier, of the group of component carriers, having an earliest slot, after the first slot, that is available to carry the second repetition, the second repetition being transmitted in the earliest slot.

In one aspect of the present disclosure, a method for wireless communication by a UE is disclosed. The method includes receiving, from a base station, a repetition configuration indicating a number of repetitions of a PUCCH transmission including at least a first repetition. The method also includes receiving, from the base station based on the number of repetitions satisfying a repetition criterion, a component carrier parameter indicating a component carrier, of a group of component carriers that includes a primary component carrier and one or more secondary components carriers, to use for the first repetition of the PUCCH transmission. The method further includes transmitting, to the base station, the first repetition of the PUCCH transmission on a first component carrier, of the group of component carriers, based on the number of repetitions indicated in the repetition configuration. The first component carrier corresponds to the component carrier indicated in the component carrier parameter based on the number of repetitions satisfying the repetition criterion.

Another aspect of the present disclosure is directed to an apparatus including means for receiving, from a base station, a repetition configuration indicating a number of repetitions of a PUCCH transmission including at least a first repetition. The apparatus also includes means for receiving, from the base station based on the number of repetitions satisfying a repetition criterion, a component carrier parameter indicating a component carrier, of a group of component carriers that includes a primary component carrier and one or more secondary components carriers, to use for the first repetition of the PUCCH transmission. The apparatus further includes means for transmitting, to the base station, the first repetition of the PUCCH transmission on a first component carrier, of the group of component carriers, based on the number of repetitions indicated in the repetition configuration. The first component carrier corresponds to the component carrier indicated in the component carrier parameter based on the number of repetitions satisfying the repetition criterion.

In another aspect of the present disclosure, a non-transitory computer-readable medium with non-transitory program code recorded thereon is disclosed. The program code is for wireless communication at a UE. The program code is executed by a processor and includes program code to receive, from a base station, a repetition configuration indicating a number of repetitions of a PUCCH transmission including at least a first repetition. The program code also includes program code to receive, from the base station based on the number of repetitions satisfying a repetition criterion, a component carrier parameter indicating a component carrier, of a group of component carriers that includes a primary component carrier and one or more secondary components carriers, to use for the first repetition of the PUCCH transmission. The program code still further includes program code to transmit, to the base station, the first repetition of the PUCCH transmission on a first component carrier, of the group of component carriers, based on the number of repetitions indicated in the repetition configuration. The first component carrier corresponds to the component carrier indicated in the component carrier parameter based on the number of repetitions satisfying the repetition criterion.

Another aspect of the present disclosure is directed to an apparatus. The apparatus having a memory, one or more processors coupled to the memory, and instructions stored in the memory. The instructions being operable, when executed by the processor, to cause the apparatus to receive, from a base station, a repetition configuration indicating a number of repetitions of a PUCCH transmission including at least a first repetition. The instructions also cause the apparatus to receive, from the base station based on the number of repetitions satisfying a repetition criterion, a component carrier parameter indicating a component carrier, of a group of component carriers that includes a primary component carrier and one or more secondary components carriers, to use for the first repetition of the PUCCH transmission. The instructions additionally cause the apparatus to transmit, to the base station, the first repetition of the PUCCH transmission on a first component carrier, of the group of component carriers, based on the number of repetitions indicated in the repetition configuration. The first component carrier corresponds to the component carrier indicated in the component carrier parameter based on the number of repetitions satisfying the repetition criterion.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
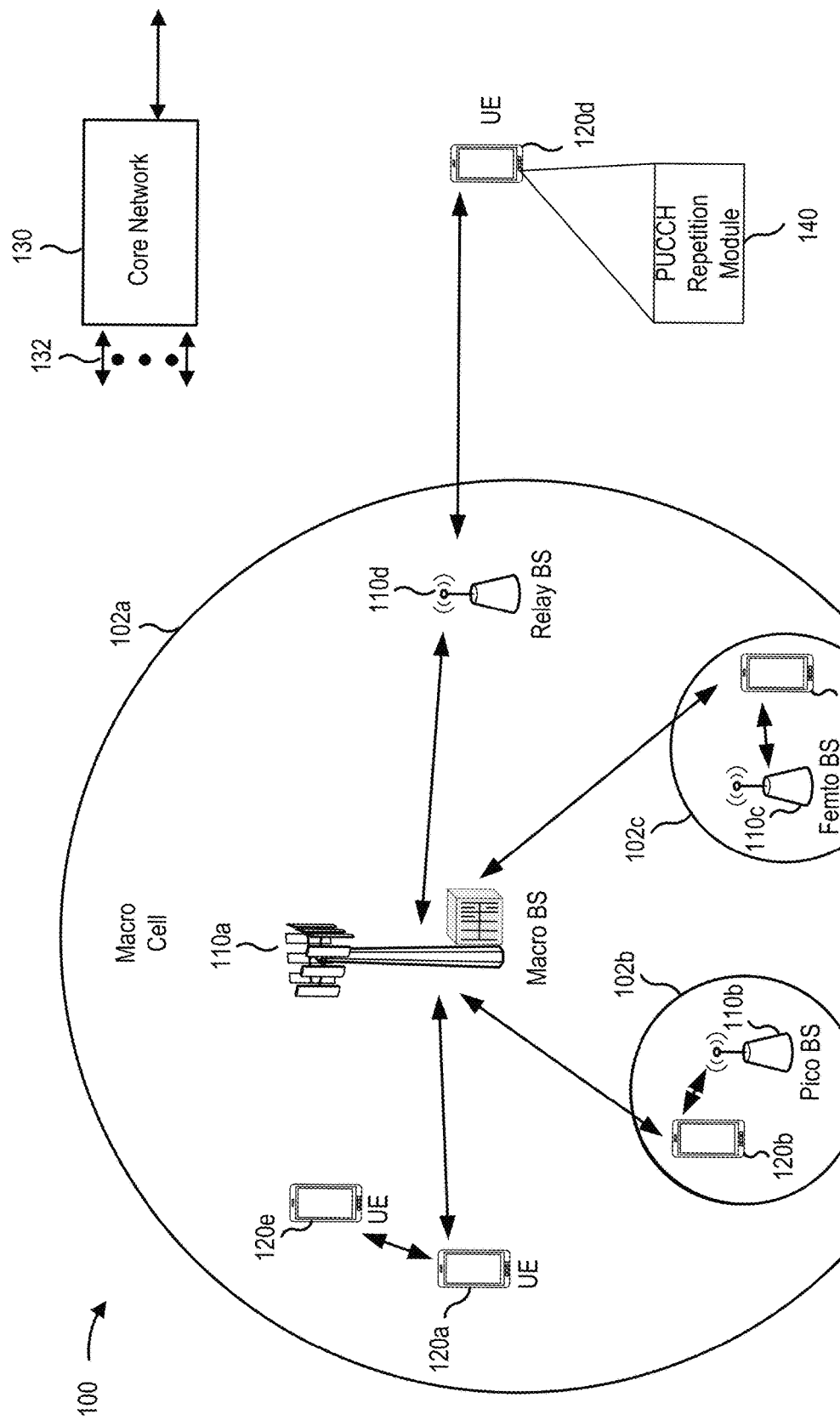
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various devices and techniques. These devices and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with the 3GPP 5G standard, aspects of the present disclosure can be applied in other wireless technologies including in later generations of the 3GPP standard including 6G.

As discussed, in an example communication system that supports uplink carrier aggregation (CA), multiple component carriers (CCs) may be available to a user equipment (UE) for uplink transmission. The multiple CCs include a primary component carrier (PCC) and one or more secondary component carrier (SCC). Some wireless communication standards, such as 3GPP NR Release 15 and Release 16, limit both an initial transmission and a retransmission of a physical uplink control channel (PUCCH) to the PCC. If the PCC is a time division duplex (TDD) carrier, the PUCCH may suffer from a large delay due to an uplink/downlink/special (U/D/S) slot pattern. In such examples, uplink transmissions may not be permitted in a downlink slot and a number of symbols available for uplink transmissions in a special slot may be fewer than necessary to transmit the PUCCH. As such, the UE may need to wait until a next available uplink slot to transmit the PUCCH, rather than transmitting the PUCCH on the next physical slot in time. In some examples, a base station may also configure a UE with a number of repetitions (X) for a PUCCH transmission. For example, the base station may configure the UE with four repetitions (X=4) and the UE may transmit the PUCCH four times in four different respective slots based on the configured number of repetitions. Currents standards also specify that such PUCCH repetitions are limited to the PCC.

Aspects of the present disclosure generally relate to techniques and devices for enabling PUCCH repetitions on multiple CCs. Some aspects more specifically relate to enabling the transmission of PUCCH repetitions on SCCs. In some examples, a PUCCH transmission is allowed on an SCC based on the base station configuring a single repetition (X=1) for the PUCCH. Conversely, in such examples, the PUCCH repetitions may be limited to only a PCC if the base station configures more than one repetition (X>1). In some other examples, a PUCCH repetition may be allowed on the PCC or one or more SCCs regardless of whether the UE is configured with more than one PUCCH repetition. In some such examples, the UE may transmit a first repetition on a slot of the PCC or an SCC of the one or more SCCs. For one or more subsequent repetitions (for example, a second repetition), the UE may sweep subsequent slots across the CCs (including the PCC and the one or more SCCs) to identify the CC having an earliest (for example, first available UL slot, first available special slot, or first available flexible slot) slot in time that may accommodate a size of the PUCCH repetition. The UE may then transmit the next PUCCH repetition in the first available slot on the identified CC.

Particular aspects of the subject matter described in this disclosure may be implemented to realize one or more of the following potential advantages. In some examples, repeating PUCCH transmissions on one or both of a PCC or one or more SCCs may decrease an amount of time associated with transmitting the PUCCH repetitions to a base station. Decreasing the amount of time associated with transmitting the PUCCH repetitions may decrease a time associated with receiving feedback from the base station based on the PUCCH repetitions. Decreasing the time associated with receiving feedback from the base station may increase communication speed and reduce latency. For example, subsequent transmissions from the UE may be dependent on the feedback from the base station. Therefore, decreasing the feedback time may decrease a time between UE transmissions.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with UEs and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a PUCCH repetition module 140. For brevity, only one UE 120d is shown as including the PUCCH repetition module 140. The PUCCH repetition module 140 may transmit a first repetition of a physical uplink control channel (PUCCH) transmission in a first slot on a first component carrier. The PUCCH repetition module 140 may also select a second component carrier different than the first component carrier on which to transmit a second repetition of the PUCCH transmission based on a first candidate slot on the second component carrier occurring after the first slot and earlier in time than a second candidate slot of the first component carrier. The PUCCH repetition module 140 may transmit a second repetition of the PUCCH transmission in the first candidate slot on the second component carrier based on the selection. The PUCCH repetition module 140 may determine a repetition configuration for a physical uplink control channel (PUCCH) transmission; and transmit a first repetition of the PUCCH transmission on a primary component carrier or a secondary component carrier in response to the repetition configuration indicating a single repetition. The PUCCH repetition module 140 may transmit the first repetition of the PUCCH transmission on the primary component carrier in response to the repetition configuration indicating multiple repetitions.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
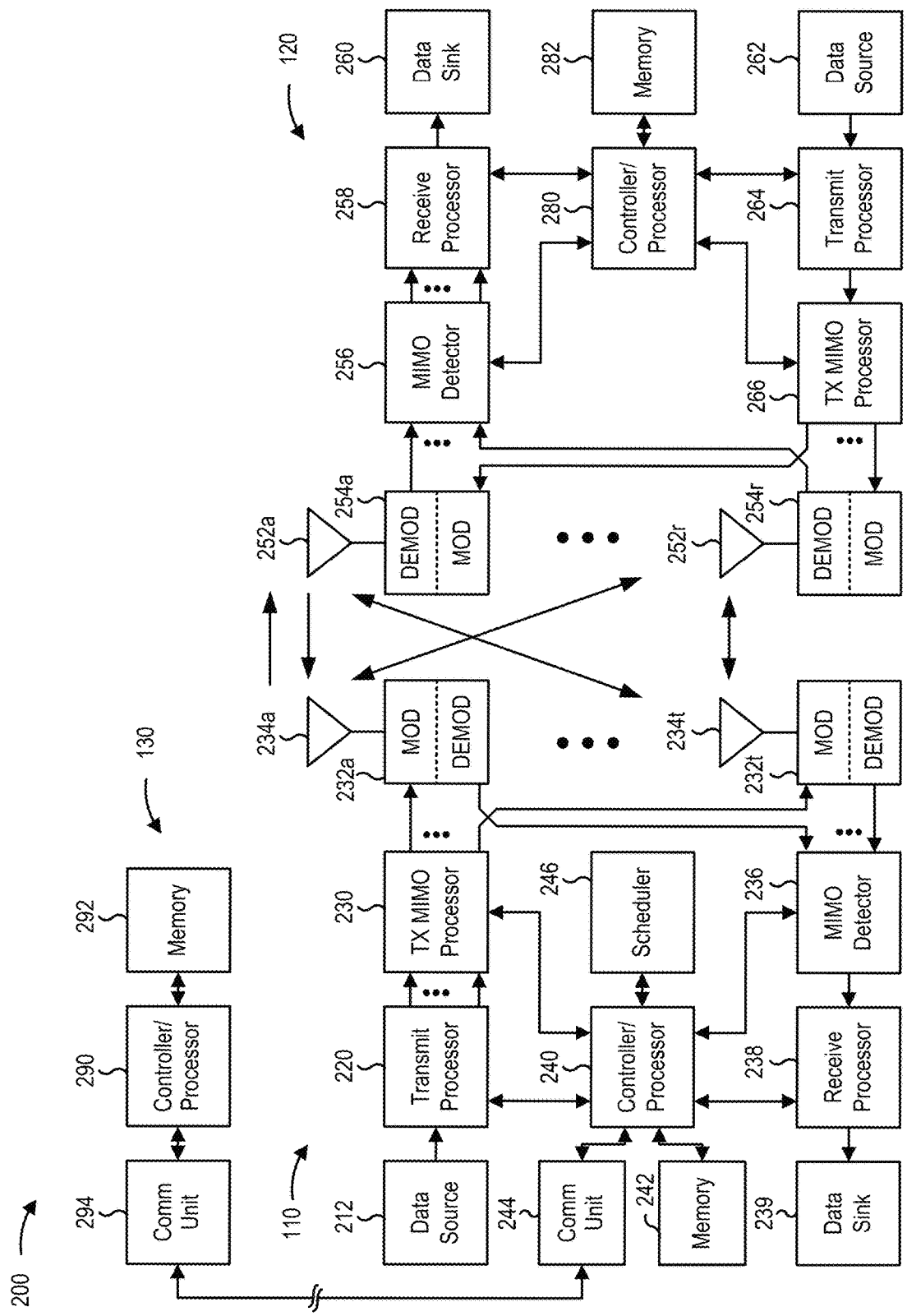
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with PUCCH repetition, as described in more detail elsewhere. For example, the controller/processor 240 of the base station 110, the controller/processor 280 of the UE 120, and/or any other component(s) of FIG. 2 may perform or direct operations of, for example, the processes of FIGS. 10 and 11 as well as other processes as described. Memories 242 and 282 may store data and program codes for the base station 110 and UE 120, respectively. A scheduler 246 may schedule UEs for data transmission on the downlink and/or uplink.

As described above, in an example uplink CA system, multiple CCs may be available for uplink transmission. The CCs may include a PCC and one or more SCCs from a PUCCH group. A UE may transmit various signals and channels on the uplink to a base station, such as a PUCCH. Some standards, such as 3GPP NR Release 15 and Release 16, specify that the PUCCH is to be transmitted on the PCC. If the PCC is a TDD carrier, the PUCCH may suffer from a large delay due to a U/D/S slot pattern. That is, uplink transmissions may not be permitted in a downlink slot and a number of symbols available for uplink transmissions in a special slot may be fewer than necessary to transmit the PUCCH. As such, the UE may need to wait until a next available uplink slot to transmit the PUCCH, rather than transmitting the PUCCH on the next physical slot in time. In some examples, a base station may also configure a UE with a number of times, X, to repeat a PUCCH transmission. In such an example, the base station may configure the UE with four repetitions (X=4). As such, the UE may transmit the PUCCH four times in four different respective slots based on the number of repetitions being four. According to current 3GPP standards, the PUCCH repetitions also may only be repeated on the PCC.

Figure 3:
FIG. 3 is a block diagram illustrating an example physical uplink control channel (PUCCH) group.

FIG. 3 is a block diagram illustrating an example PUCCH group. In the example of FIG. 3, the PUCCH group includes a PCC and two SCCs (SCC-1 and SCC-2). According to the current standards, the UE transmits the PUCCH on the PCC.

Figure 4:
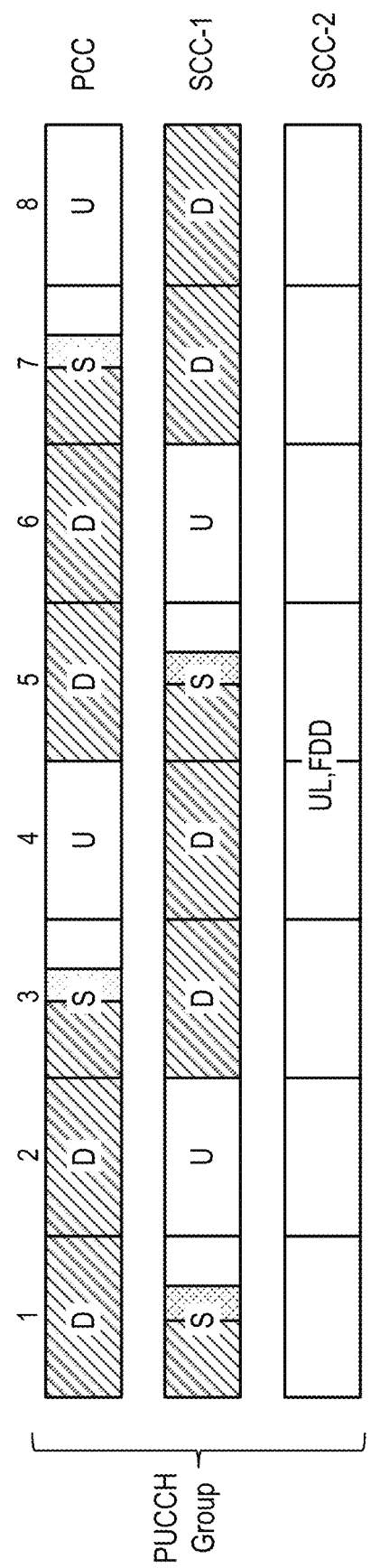
FIG. 4 is a block diagram illustrating component carriers (CCs) within a PUCCH group including multiple slots.

FIG. 4 is a block diagram illustrating CCs within a PUCCH group including multiple slots. In the example of FIG. 4, each of the slots labeled 'D' corresponds to a downlink slot, each of the slots labeled 'U' corresponds to an uplink slot, and each of the slots labeled 'S' corresponds to a special slot. The special slot may include a downlink portion, an uplink portion, and a gap in between the uplink and downlink portions. The hatched shading in FIG. 4, for example in the slots labeled 'D', represents downlink resources. The lack of shading in FIG. 4, for example in the slots labeled 'U', represents uplink resources. The dotted shading, for example in the slots labeled 'S', represents a gap period between uplink and downlink resources, during which no communication occurs. In the example of FIG. 4, assuming a UE is to transmit a PUCCH (or PUCCH repetition in the case of transmitting multiple repetitions), the UE needs to wait until the fourth slot to transmit the PUCCH, which is the first available uplink slot in the PCC. In the example of FIG. 4, the third slot, which is a special slot, is not a candidate for transmitting the PUCCH because the uplink portion of the third slot does not have a sufficient quantity of OFDM symbols to carry the PUCCH repetition.

In some implementations, a UE may transmit a PUCCH (or PUCCH repetition in the case of transmitting multiple repetitions) to a base station on an SCC. In some examples, the UE may transmit the PUCCH or the PUCCH repetition on the SCC based on the base station configuring a PUCCH carrier/cell switch via an RRC parameter. In TDD uplink CA (for example, where all CCs in a PUCCH group are TDD carriers), a base station may configure a TDD pattern in a staggered or complementary fashion in the time domain. Thus, in some examples, a larger number of slots may be available across all CCs for uplink transmission. Referring back to FIG. 4, according to these implementations, the UE may transmit the PUCCH in the second slot of the first SCC (SCC-1), which is before the fourth slot of the PCC. In an ideal case across all CCs (the PCC and SCCs), at least one CC is available for uplink transmission in each slot. It is noted that in uplink CA where at least one CC is a frequency division duplex (FDD) carrier, a base station does not need to configure a TDD pattern in a staggered or complementary fashion because an uplink transmission is always available on the FDD carrier.

In some examples, the base station may also configure a UE with a number of times, X, to repeat a PUCCH transmission. In such an example, the base station may configure the UE to transmit four repetitions (X=4). As such, the UE may transmit the PUCCH four times in four different respective slots based on the number of repetitions being four. In some examples, each slot can carry only one PUCCH repetition. According to current 3GPP standards, the UE may only repeat transmission of the PUCCH on the PCC.

Figure 5:
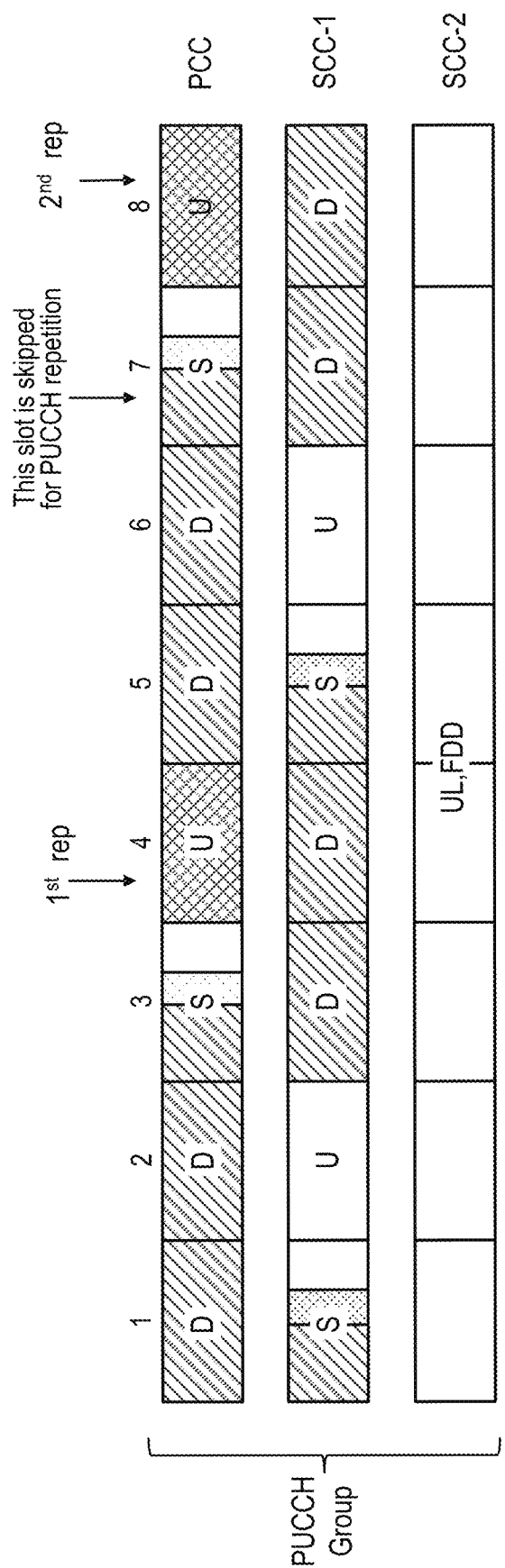
FIG. 5 is a block diagram illustrating example CCs for PUCCH repetition.

FIG. 5 is a block diagram illustrating example CCs for PUCCH repetition. In the example of FIG. 5, a base station has configured the PUCCH for two repetitions (X=2). Each repetition may have a duration, Y, of fourteen (14) orthogonal frequency division multiplexing (OFDM) symbols (Y=14). The hatched shading in FIG. 5, for example in the slots labeled 'D', represents downlink resources. The lack of shading in FIG. 5, for example in the slots labeled 'U', represents uplink resources. The dotted shading, for example in the slots labeled 'S', represents a gap period between uplink and downlink resources, during which no communication occurs. The cross-hatched shading represents slots selected for PUCCH transmission. The base station may indicate a starting slot for a first repetition (for example, the initial PUCCH transmission). In the example shown in FIG. 5, the first repetition occurs in the fourth slot of the PCC, which is the first available uplink slot of the PCC. According to the current standards, the UE transmits the second repetition in the eighth slot of the PCC, as seen in FIG. 5. In the example shown in FIG. 5, the seventh slot, which is a special slot (S), does not have fourteen uplink symbols, and is therefore not a candidate for transmission of the PUCCH repetition.

According to aspects of the present disclosure, PUCCH repetitions may occur on SCCs. In some implementations, for subsequent repetitions, a UE may sweep subsequent uplink slots across the PCC and SCCs, and may transmit the PUCCH repetition on a first available slot with a number of uplink OFDM symbols sufficient to accommodate the size of one PUCCH repetition.

Figure 6A:
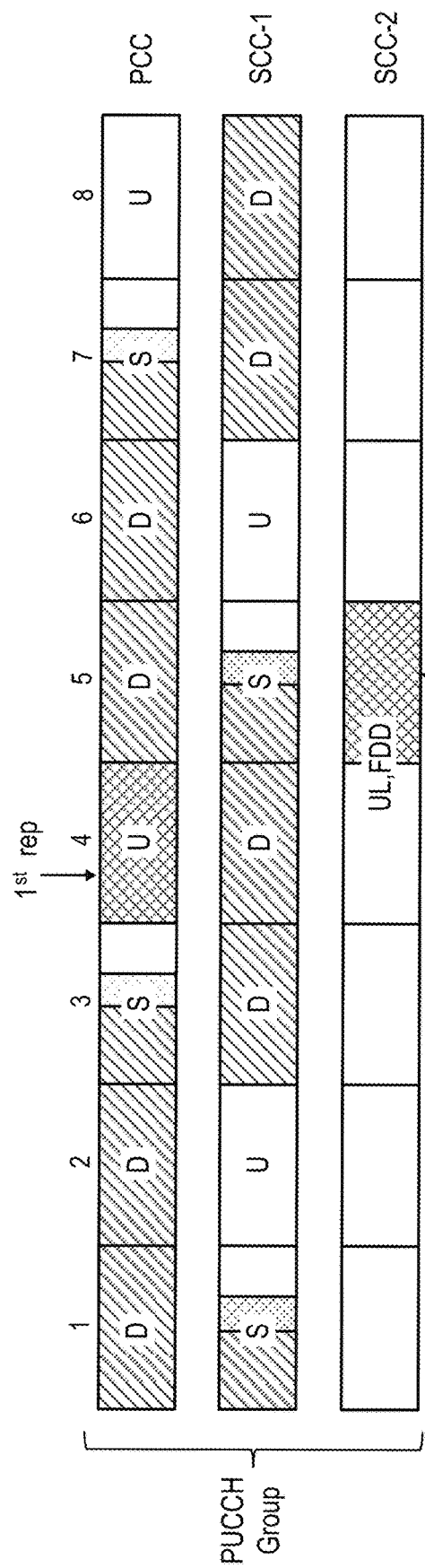
FIG. 6A is a block diagram illustrating example PUCCH repetition on a primary component carrier (PCC) and one or more secondary component carriers (SCCs), in accordance with aspects of the present disclosure.

FIG. 6A is a block diagram illustrating an example of a PUCCH repetition on a PCC and one or more SCCs, in accordance with aspects of the present disclosure. In the example of FIG. 6A, a base station has configured the PUCCH for two repetitions (X=2). Each repetition may have a duration, Y, of fourteen (14) OFDM symbols (Y=14). The hatched shading in FIG. 6A, for example in the slots labeled 'D', represents downlink resources. The lack of shading in FIG. 6A, for example in the slots labeled 'U', represents uplink resources. The dotted shading, for example in the slots labeled 'S', represents a gap period between uplink and downlink resources, during which no communication occurs. The cross-hatched shading represents slots selected for PUCCH transmission. In the example of FIG. 6A, the base station may indicate a starting slot for a first repetition. The base station may dynamically indicate the starting slot with DCI or may semi-statically indicate the starting slot with RRC signaling. In the example shown in FIG. 6A, the first repetition occurs in the fourth slot of the PCC, which is the first available uplink slot of the PCC. The UE may sweep available CCs at the next slot and may determine the second repetition occurs in the fifth slot of the second SCC (SCC-2) because the second SCC (SCC-2) has sufficient uplink resources to accommodate the size of the second repetition. It is noted that the second repetition in the fifth slot occurs earlier in time than the eighth slot of the PCC, which the 3GPP standard currently specifies.

In some implementations, PUCCH repetitions may cross CCs (for example, across the PCC and SCCs) where a first repetition occurs on a first CC and a second repetition occurs on a second, different CC. In some examples, a PUCCH transmission may repeat on an SCC based on the PUCCH transmission being configured with a single repetition (X=1). In other examples, the repetitions of the PUCCH transmissions may be limited to the PCC based on the PUCCH transmission being configured with more than one repetition (X>1).

In still other examples, the UE may repeat PUCCH transmissions on different CCs, regardless of whether a configuration is for a single repetition. In such examples, the UE may transmit a first repetition on a slot signaled by a base station. For subsequent repetitions, the UE may sweep the subsequent slots to locate an earliest slot in time that can accommodate the size of the repetition.

Figure 6B:
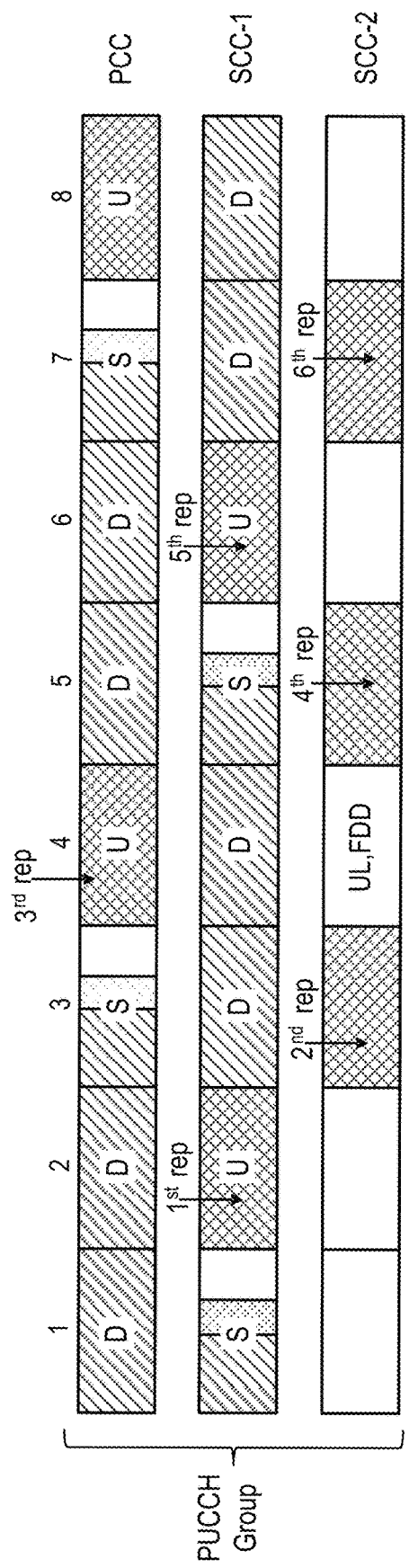
FIG. 6B is another block diagram illustrating example PUCCH repetition on a PCC and one or more SCCs, in accordance with aspects of the present disclosure.

FIG. 6B is another block diagram illustrating example PUCCH repetition on a PCC and one or more SCCs, in accordance with aspects of the present disclosure. FIG. 6B expands on the concepts illustrated by FIG. 6A, with the first PUCCH repetition now occurring in an SCC instead of a PCC. In the example of FIG. 6B, a base station configures the PUCCH for six repetitions (X=6). Each repetition has a duration of fourteen OFDM symbols (Y=14). The hatched shading in FIG. 6B, for example in the slots labeled 'D', represents downlink resources. The lack of shading in FIG. 6B, for example in the slots labeled 'U', represents uplink resources. The dotted shading, for example in the slots labeled 'S', represents a gap period between uplink and downlink resources, during which no communication occurs. The cross-hatched shading represents slots selected for PUCCH transmission. In the example shown in FIG. 6B, the UE transmits the first repetition in the second slot on the first SCC (SCC-1), based on the configuration the UE receives from the base station. The UE transmits the second repetition in the third slot of the second SCC (SCC-2).

According to aspects of the present disclosure, if multiple CCs are available for transmitting a repetition, the repetition may be transmitted on the CC with a smaller CC index. This rule may apply to a first repetition or any subsequent repetition. In FIG. 6B, the fourth slot of the PCC and the fourth slot of the second SCC (SCC-2) may each accommodate the size of the third repetition. In some examples, the UE may select the PCC for the PUCCH repetition based on the PCC having a smaller CC index. As shown in FIG. 6B, the UE may select the resources for the remaining repetitions in a similar manner (for example, based on an ordering of the CC index). In other examples, if multiple CCs are available for the next PUCCH repetition, the next repetition may be transmitted on the CC with a larger CC index (not shown in FIG. 6B).

In some examples, PUCCH repetitions may be allowed on all CCs, however, some CCs may have a different numerology, also referred to as a subcarrier spacing (SCS). In such examples, the definition of a slot becomes ambiguous. In some implementations, PUCCH repetitions are only allowed on CCs with a same numerology as a first CC on which the UE transmits the first PUCCH repetition.

In other implementations, PUCCH repetitions may be allowed across CCs with different numerologies. In such implementations, one of the CCs may be designated as a reference CC. The numerology of the reference CC may determine a slot boundary and a slot index. For example, the reference CC designation may be hard coded in the standard. In this example, the standard may specify the PCC or a PUCCH secondary cell as the reference CC or the standard may specify the CC with the smallest subcarrier spacing as the reference CC. In another example, the base station may signal the reference CC designation via RRC signaling. The base station may specify the PCC as the reference CC or may specify the CC with the smallest subcarrier spacing as the reference CC.

In such implementations, the UE transmits a first PUCCH repetition on a slot signaled by a base station, referred to as the slot index. For later repetitions, the UE may sweep the subsequent slots to locate an earliest time slot that can accommodate the size of the next repetition. In some examples, particular slots to sweep may be based on the reference CC. If multiple CCs are available, the first repetition may be transmitted on the CC with a smaller (or larger) CC index.

Figure 7:
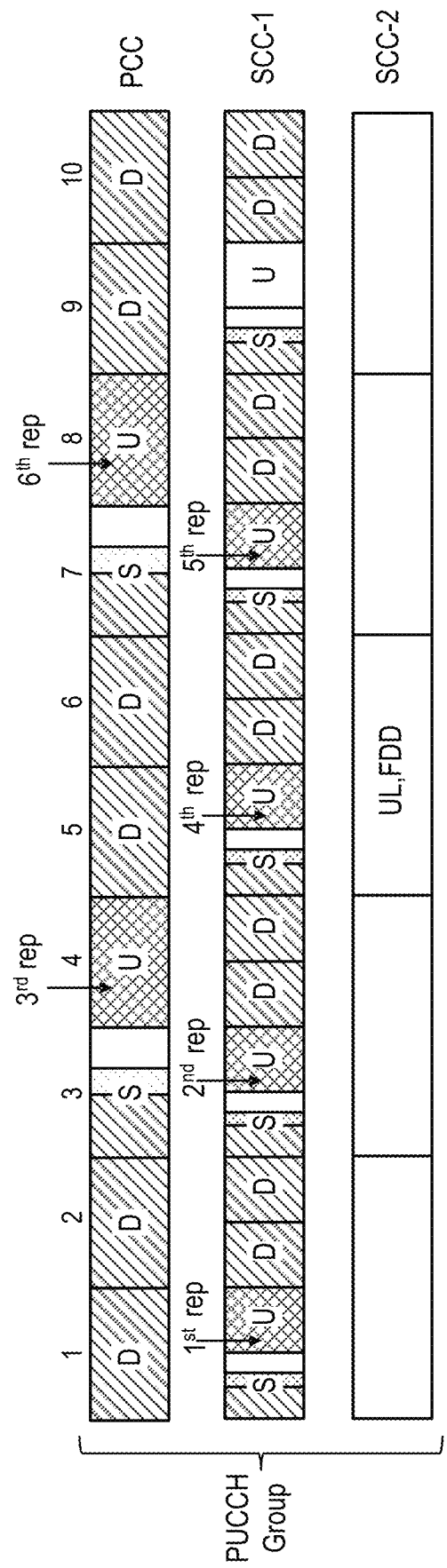
FIG. 7 is a block diagram illustrating example PUCCH repetition on a PCC and one or more SCCs with different numerologies, in accordance with aspects of the present disclosure.

FIG. 7 is a block diagram illustrating example PUCCH repetition on a PCC and one or more SCCs with different numerologies, in accordance with aspects of the present disclosure. In the example of FIG. 7, a PUCCH is configured with six repetitions (X=6) and each repetition has a duration of fourteen OFDM symbols (Y=14). The hatched shading in FIG. 7, for example in the slots labeled 'D', represents downlink resources. The lack of shading in FIG. 7, for example in the slots labeled 'U', represents uplink resources. The dotted shading, for example in the slots labeled 'S', represents a gap period between uplink and downlink resources, during which no communication occurs. The cross-hatched shading represents slots selected for PUCCH transmission. In the example of FIG. 7, the reference CC is the PCC, which has a sub-carrier spacing of 30 kHz. The first SCC (SCC-1) has a sub-carrier spacing of 60 kHz and the second SCC (SCC-2) has a sub-carrier spacing of 15 kHz. Thus, the second SCC (SCC-2) has only seven symbols and cannot carry any repetition with a duration of fourteen symbols.

In the example of FIG. 7, a base station may provide a slot index of one for the first repetition. As described above, the base station may provide the slot index via DCI or RRC signaling. In this example, the first slot of the PCC is a downlink slot and the first slot of the second SCC (SCC-2) only has seven symbols. Additionally, the first and second slots of the first SCC (SCC-1) may both align in time with the first slot of the reference CC, which is the PCC in this example. The first slot of the first SCC (SCC-1) may not have a sufficient number of symbols to accommodate the number of symbols of the PUCCH transmission. Thus, the UE may select the second slot of the first SCC (SCC-1) for the first repetition. The next available slot aligns in time with the third slot of the reference CC. In such examples, the UE may select the sixth slot of the first SCC (SCC-1). The UE selects the resources for the remaining repetitions in a similar manner, as seen in FIG. 7.

Figure 8:
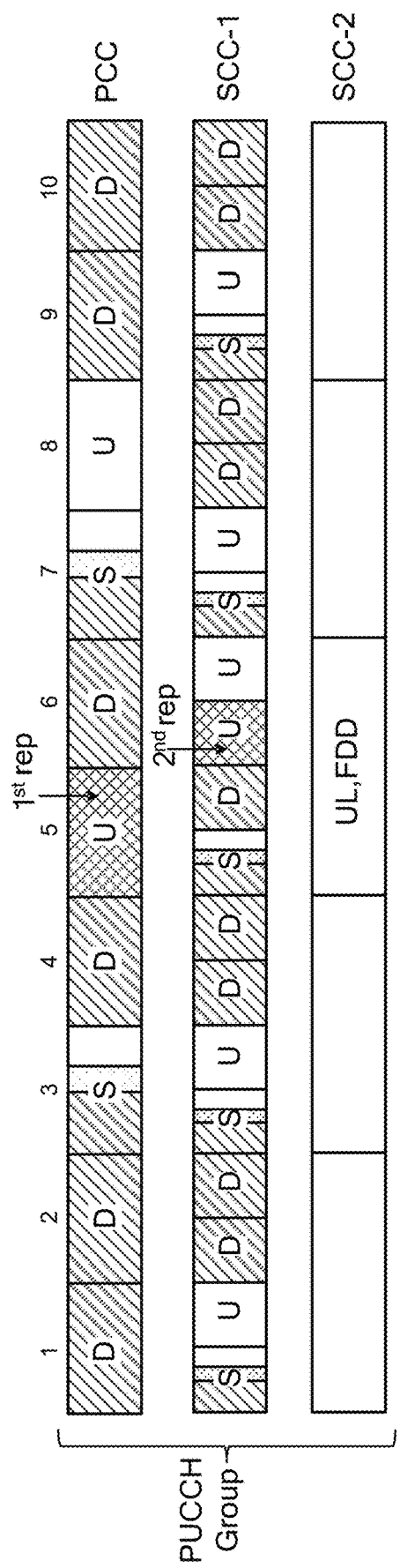
FIG. 8 is another block diagram illustrating example PUCCH repetition on a PCC and one or more SCCs with different numerologies, in accordance with aspects of the present disclosure.

In some implementations, when two slots align in time with a reference slot, the UE may select the earliest slot. FIG. 8 is another block diagram illustrating example PUCCH repetition on a PCC and one or more SCCs with different numerologies, in accordance with aspects of the present disclosure. The hatched shading in FIG. 8, for example in the slots labeled 'D', represents downlink resources. The lack of shading in FIG. 8, for example in the slots labeled 'U', represents uplink resources. The dotted shading, for example in the slots labeled 'S', represents a gap period between uplink and downlink resources, during which no communication occurs. The cross-hatched shading represents slots selected for PUCCH transmission. In the example of FIG. 8, the UE transmits the first repetition at the fifth slot of the PCC, which is the reference CC in this example. Additionally, in the example of FIG. 8, the PCC has a sub-carrier spacing of 30 kHz, the first SCC (SCC-1) has a sub-carrier spacing of 60 kHz and the second SCC (SCC-2) has a sub-carrier spacing of 15 kHz. The UE may transmit the second repetition on either the eleventh or twelfth slots of the first SCC (SCC-1), which both align in time with the sixth slot of the reference CC. According to these implementations, the UE may select the eleventh slot because it is earlier in time than the twelfth slot.

Figure 9:
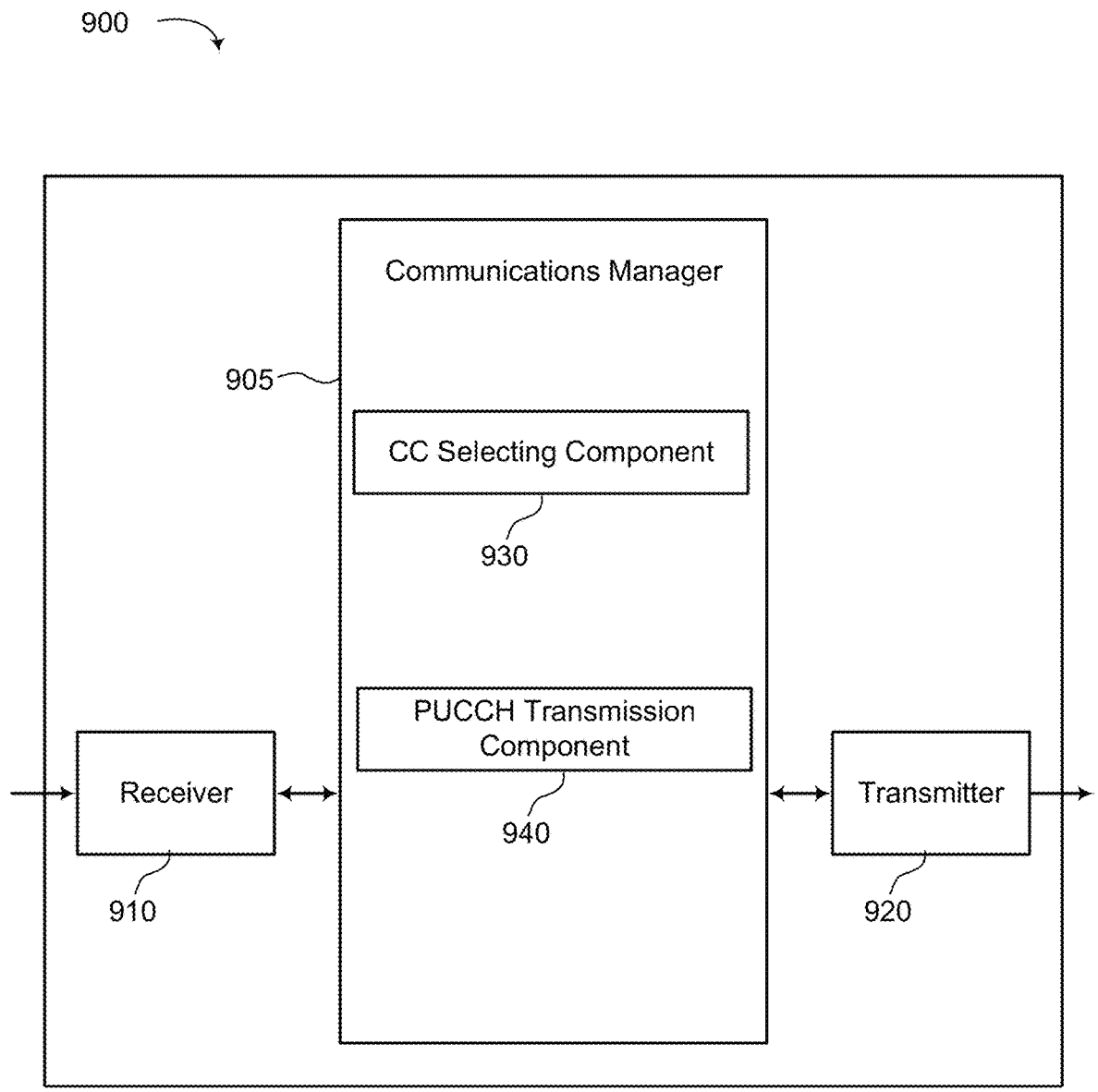
FIG. 9 is a block diagram illustrating an example of a wireless communication device that supports PUCCH repetition on a PCC and one or more SCCs, in accordance with aspects of the present disclosure.

FIG. 9 is a block diagram illustrating an example of a wireless communication device 900 that supports PUCCH repetition on a PCC and one or more SCCs, in accordance with aspects of the present disclosure. The device 900 may be an example of aspects of a UE 120 described with reference to FIG. 1. The wireless communication device 900 may include a receiver 910, a communications manager 905, a transmitter 920, a CC selecting component 930, and a PUCCH transmission component 940, which may be in communication with one another (for example, via one or more buses). In some examples, the wireless communication device 900 is configured to perform operations, including operations of the processes 1000, 1100 described below with reference to FIGS. 10 and 11.

In some examples, the wireless communication device 900 can include a chip, chipset, package, or device that includes at least one processor and at least one modem (for example, a 5G modem or another cellular modem). In some examples, the communications manager 905, or its sub-components, may be separate and distinct components. In some examples, at least some components of the communications manager 905 are implemented at least in part as software stored in a memory. For example, portions of one or more of the components of the communications manager 905 can be implemented as non-transitory code executable by the processor to perform the functions or operations of the respective component.

The receiver 910 may receive one or more reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a base station 110 described with reference to FIG. 1.

The received information may be passed on to other components of the device 900. The receiver 910 may be an example of aspects of the receive processor 258 described with reference to FIG. 2. The receiver 910 may include a set of radio frequency (RF) chains that are coupled with or otherwise utilize a set of antennas (for example, the set of antennas may be an example of aspects of the antennas 252a through 252r described with reference to FIG. 2).

The transmitter 920 may transmit signals generated by the communications manager 905 or other components of the wireless communication device 900. In some examples, the transmitter 920 may be collocated with the receiver 910 in a transceiver. The transmitter 920 may be an example of aspects of the transmit processor 264 described with reference to FIG. 2. The transmitter 920 may be coupled with or otherwise utilize a set of antennas (for example, the set of antennas may be an example of aspects of the antennas 252a through 252r described with reference to FIG. 2), which may be antenna elements shared with the receiver 910. In some examples, the transmitter 920 is configured to transmit control information in a PUCCH and data in a physical uplink shared channel (PUSCH).

The communications manager 905 may be an example of aspects of the controller/processor 280 described with reference to FIG. 2. The communications manager 905 may include the CC selecting component 930 and the PUCCH transmission component 940. In some implementations, the CC selecting component 930, working in conjunction with the receiver 910, may receive, from a base station, a repetition configuration indicating a number of repetitions of a PUCCH transmission. In some examples, the repetition configuration includes at least a first repetition and a second repetition. Additionally, the PUCCH transmission component 940, working in conjunction with the transmitter 920 and the CC selecting component 930, may transmit, to the base station, the first repetition of the PUCCH transmission in a first slot on a first component carrier, of a group of component carriers that includes a primary component carrier and one or more secondary components carriers, based on receiving the repetition configuration. The PUCCH transmission component 940, working in conjunction with the transmitter 920 and the CC selecting component 930, may transmit, to the base station, the second repetition of the PUCCH transmission on either the first component carrier or a second component carrier, of the group of component carriers, having an earliest slot, after the first slot, that is available to carry the second repetition, the second repetition being transmitted in the earliest slot.

In other implementations, the CC selecting component 930, working in conjunction with the receiver 910, may receive, from a base station, a repetition configuration indicating a number of repetitions of a PUCCH transmission. In some examples, the repetition configuration includes at least a first repetition. Additionally, the CC selecting component 930, working in conjunction with the receiver 910 may receive, from the base station based on the number of repetitions satisfying a repetition criterion, a component carrier parameter indicating a component carrier, of a group of component carriers that includes a primary component carrier and one or more secondary components carriers, to use for the first repetition of the PUCCH transmission. Furthermore, the PUCCH transmission component 940, working in conjunction with the transmitter 920 and the CC selecting component 930, may transmit, to the base station, a first repetition of a PUCCH transmission in a first slot on a first component carrier based on receiving the repetition configuration. The PUCCH transmission component the first repetition of the PUCCH transmission on a first component carrier, of the group of component carriers, based on the number of repetitions indicated in the repetition configuration. The first component carrier may correspond to the component carrier indicated in the component carrier parameter based on the number of repetitions satisfying the repetition criterion.

Figure 10:
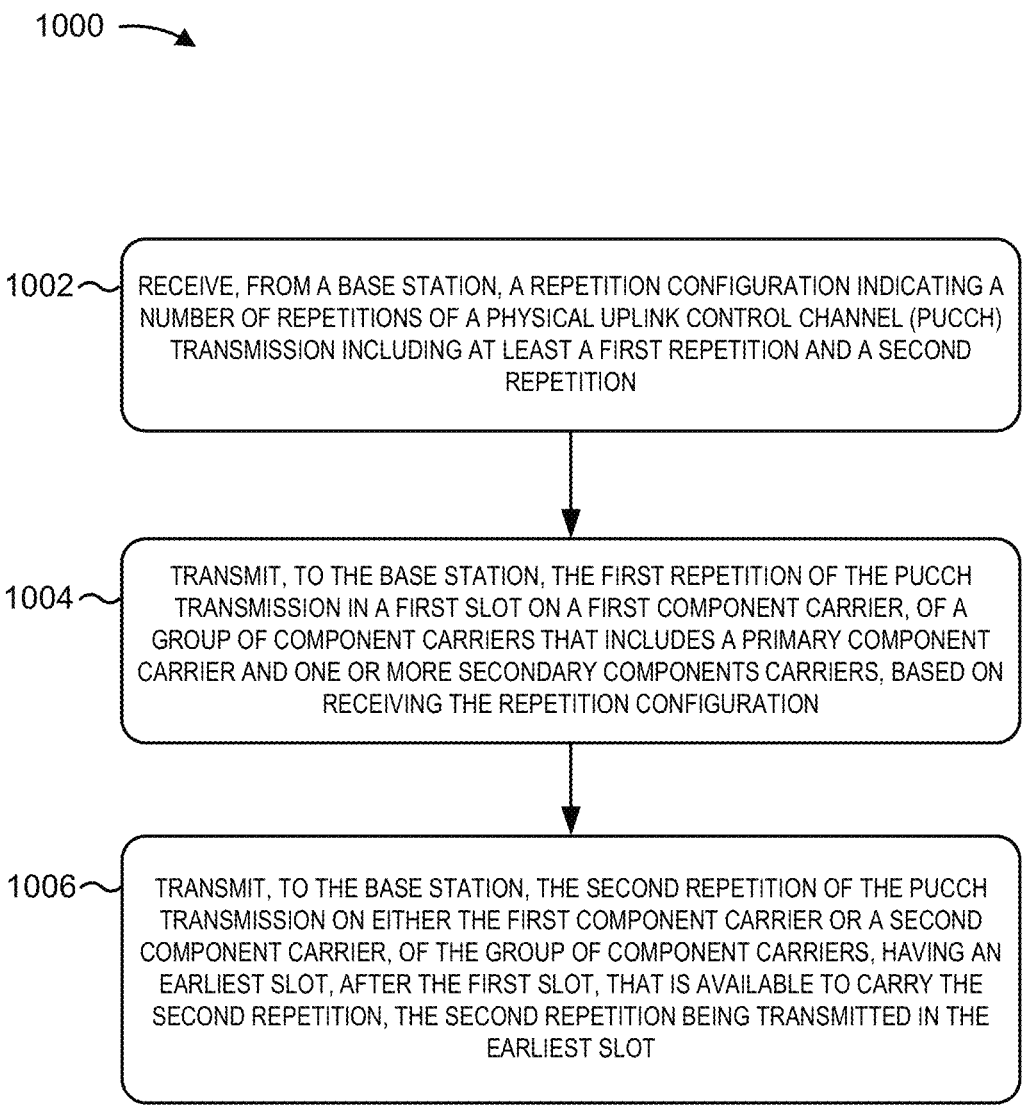
FIG. 10 is a flow diagram illustrating an example process performed, for example, by a UE, for transmitting PUCCH repetitions on a PCC and one or more SCCs, in accordance with various aspects of the present disclosure.

FIG. 10 is a flow diagram illustrating an example process 1000 performed, for example, by a UE, for transmitting PUCCH repetitions on a PCC and one or more SCCs, in accordance with various aspects of the present disclosure. For example, operations of the process 1000 may be performed by a communications manager 905 as described with reference to FIG. 9. The UE may be an example of the UE 120 described with reference to FIGS. 1 and 2. In some examples, the UE may execute a set of instructions to control the functional elements of the UE to perform the operations or functions described below. Additionally, or alternatively, a UE may perform aspects of the operations or functions described below using special-purpose hardware.

As shown in FIG. 10, the process 1000 begins at block 1002 by receiving, from a base station, a repetition configuration indicating a number of repetitions of a PUCCH transmission including at least a first repetition and a second repetition. At block 1004, the process 1000 transmits, to the base station, the first repetition of the PUCCH transmission in a first slot on a first component carrier, of a group of component carriers that includes a primary component carrier and one or more secondary components carriers, based on receiving the repetition configuration. At block 1006, the process 1000 transmits, to the base station, the second repetition of the PUCCH transmission on either the first component carrier or a second component carrier, of the group of component carriers, having an earliest slot, after the first slot, that is available to carry the second repetition, the second repetition being transmitted in the earliest slot.

Figure 11:
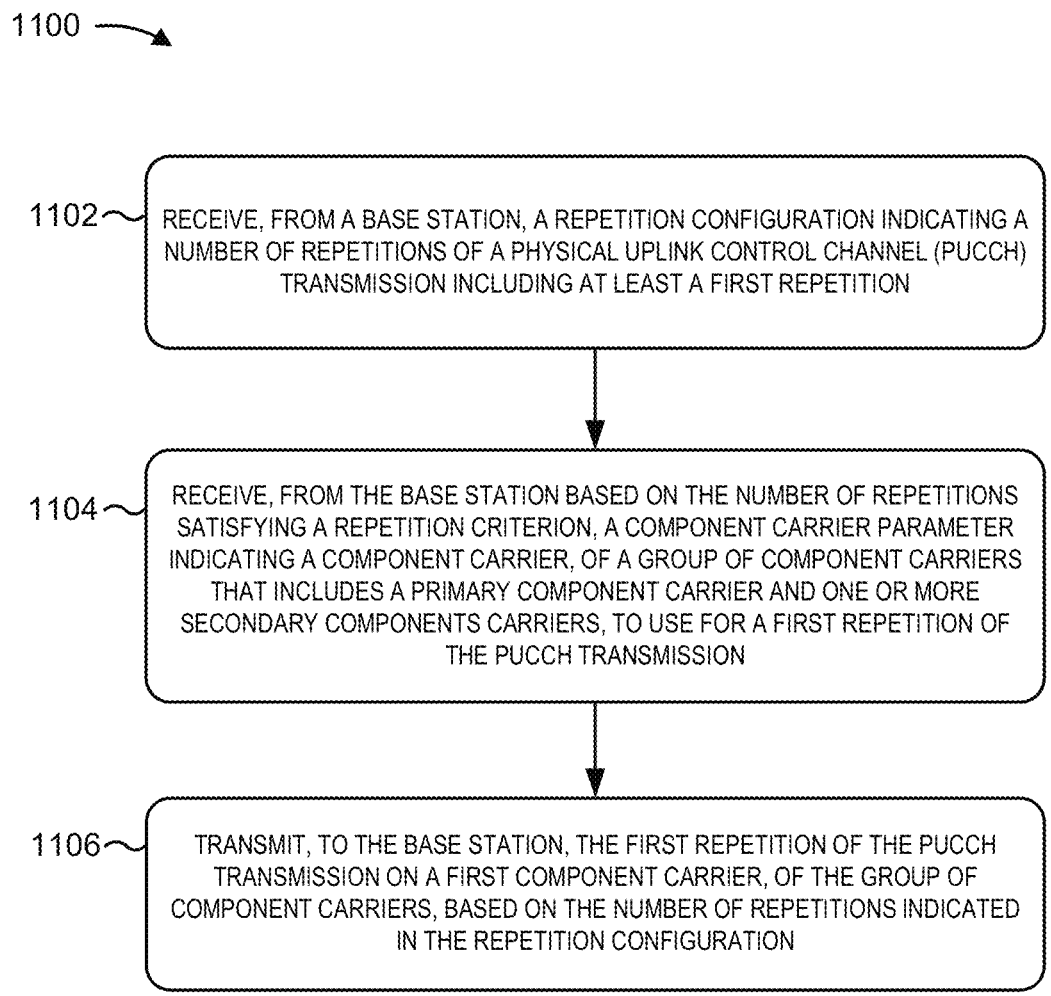
FIG. 11 is a flow diagram illustrating an example process performed, for example, by a UE, for determining CCs for transmitting PUCCH repetitions, in accordance with various aspects of the present disclosure.

FIG. 11 is a flow diagram illustrating an example process 1100 performed, for example, by a UE, for determining CCs for transmitting PUCCH repetitions, in accordance with various aspects of the present disclosure. For example, operations of the process 1100 may be performed by a communications manager 905 as described with reference to FIG. 9. The UE may be an example of the UE 120 described with reference to FIGS. 1 and 2. In some examples, the UE may execute a set of instructions to control the functional elements of the UE to perform the operations or functions described below. Additionally, or alternatively, a UE may perform aspects of the operations or functions described below using special-purpose hardware.

As shown in FIG. 11, the process 1100 begins at block 1102 by receiving, from a base station, a repetition configuration indicating a number of repetitions of a PUCCH transmission including at least a first repetition. At block 1104, the process 1100 receives, from the base station based on the number of repetitions satisfying a repetition criterion, a component carrier parameter indicating a component carrier, of a group of component carriers that includes a primary component carrier and one or more secondary components carriers, to use for the first repetition of the PUCCH transmission. At block 1106, the process 1100 transmits, to the base station, first repetition of the PUCCH transmission on a first component carrier, of the group of component carriers, based on the number of repetitions indicated in the repetition configuration. The first component carrier may correspond to the component carrier indicated in the component carrier parameter based on the number of repetitions satisfying the repetition criterion.

In some aspects, techniques for enabling PUCCH repetition across multiple component carriers may include additional aspects, such as any single aspect or any combination of aspects described below or in connection with one or more other processes or devices described elsewhere herein.

In some examples, the techniques in the aspects may be implemented in a method or process. In some other examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

The following provides an overview of some Aspects of the present disclosure:

Aspect 1. A method of wireless communication performed by a UE, comprising: receiving, from a base station, a repetition configuration indicating a number of repetitions of a PUCCH transmission including at least a first repetition and a second repetition; transmitting, to the base station, the first repetition of the PUCCH transmission in a first slot on a first component carrier, of a group of component carriers that includes a primary component carrier and one or more secondary components carriers, based on receiving the repetition configuration; and transmitting, to the base station, the second repetition of the PUCCH transmission on either the first component carrier or a second component carrier, of the group of component carriers, having an earliest slot, after the first slot, that is available to carry the second repetition, the second repetition being transmitted in the earliest slot.

Aspect 2. The method of Aspect 1, further comprising receiving a slot index from the base station, wherein the first repetition of the PUCCH transmission is transmitted in the first slot on the first component carrier, based on the slot index.

Aspect 3. The method of any one of Aspects 1-2, wherein a number of available uplink orthogonal frequency division multiplexed (OFDM) symbols in the first candidate slot satisfies an availability condition, the number of available uplink OFDM symbols satisfying the availability condition based on the number of available uplink OFDM symbols being sufficient to transmit the second repetition of the PUCCH transmission.

Aspect 4. The method of Aspect 3, wherein the second component carrier is associated with a component carrier index that is largest among all candidate component carriers in the group of component carriers having the number of available uplink OFDM symbols satisfying the availability condition.

Aspect 5. The method of Aspect 3, wherein the second component carrier is associated with a component carrier index that is smallest among all candidate component carriers in the group of component carriers having the number of available uplink OFDM symbols satisfying the availability condition.

Aspect 6. The method of any one of Aspects 1-5, wherein the second component carrier has a same numerology as the first component carrier.

Aspect 7. The method of any one of Aspects 1-6, wherein the first component carrier has a different numerology than the second component carrier, and the method further comprises determining a slot boundary and a slot index for the second component carrier based on a reference component carrier.

Aspect 8. The method of Aspect 7, wherein the reference component carrier is a primary component carrier.

Aspect 9. The method of Aspect 7, wherein the reference component carrier is a component carrier with a smallest sub carrier spacing among all component carriers in the group of component carriers.

Aspect 10. The method of Aspect 7, wherein: the second repetition of the PUCCH transmission is transmitted in the first candidate slot on the second component carrier; the first candidate slot is an earliest slot of multiple physical slots of the second component carrier; and the first candidate slot aligns with a designated slot of the reference component carrier.

Aspect 11. The method of any one of Aspects 1-10, further comprising receiving, from the base station, an RRC parameter that configures a PUCCH carrier switch at the UE.

Aspect 12. A method of wireless communication performed by a UE, comprising: receiving, from a base station, a repetition configuration indicating a number of repetitions of a PUCCH transmission including at least a first repetition and a second repetition; receiving, from the base station based on the number of repetitions satisfying a repetition criterion, a component carrier parameter indicating a component carrier, of a group of component carriers that includes a primary component carrier and one or more secondary components carriers, to use for the first repetition of the PUCCH transmission; and transmitting, to the base station, the first repetition of the PUCCH transmission on a first component carrier, of the group of component carriers, based on the number of repetitions indicated in the repetition configuration, the first component carrier corresponding to the component carrier indicated in the component carrier parameter based on the number of repetitions satisfying the repetition criterion.

Aspect 13. The method of Aspect 12, wherein the number of repetitions satisfies the repetition criterion based on the number of repetitions being equal to one.

Aspect 14. The method of any one of Aspects 12-13, wherein the first component carrier is the primary component carrier based on the component carrier parameter indicating the primary component carrier and the number of repetitions being equal to one.

Aspect 15. The method of any one of Aspects 12-14, wherein the first component carrier is a secondary component carrier of the one or more secondary component carriers based on the component carrier parameter indicating the secondary component carrier and the number of repetitions being equal to one.

Aspect 16. The method of any one of Aspects 12-15, wherein the first component carrier is the primary component carrier based on the number of repetitions being greater than one.

Aspect 17. The method of Aspect 16, further comprising transmitting each respective repetition of the number of repetitions, after the first repetition, on the primary component carrier.

Aspect 18. The method of any one of Aspects 12-17, further comprising receiving, from the base station, an RRC parameter that configures a PUCCH carrier switch at the UE.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and the like.

It will be apparent that systems and/or methods described may be implemented in different forms of hardware, firmware, and a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and methods based, at least in part, on the description.

Even though particular combinations of features are recited in the claims and disclosed in the specification, these combinations are not intended to limit the disclosure of various aspects. In fact, many of these features may be combined in ways not specifically recited in the claims and disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

What is claimed is:

1. A method of wireless communication performed by a user equipment (UE), comprising:
    receiving, from a network node, a first message configuring a group of component carriers that includes a primary component carrier and one or more secondary component carriers;
    receiving, from the network node, a second message configuring a number of repetitions of a physical uplink control channel (PUCCH) transmission; and
    transmitting, to the network node, each repetition of the number of repetitions of the PUCCH transmission via the primary component carrier or a secondary component carrier of the one or more secondary component carriers in accordance with the number of repetitions, each repetition being limited to transmission on the primary component carrier in accordance with the number of repetitions being greater than one, and each repetition being transmitted on either the primary component carrier or the secondary component carrier in accordance with the number of repetitions being equal to one.

2. The method of claim 1, wherein the first message is a radio resource control (RRC) message.

3. The method of claim 1, wherein the group of component carriers are associated with a PUCCH carrier switch.

4. The method of claim 3, further comprising disabling the PUCCH carrier switch in accordance with the number of repetitions being greater than one.

5. The method of claim 1, wherein at least one component carrier of the group of component carriers is a frequency division duplex (FDD) carrier and at least one component carrier of the group of component carriers is a time division duplex (TDD) carrier.

6. A user equipment (UE), comprising:
    one or more processors; and
    one or more memories coupled with the one or more processors and storing processor-executable code that, when executed by the one or more processors, is configured to cause the UE to:
        receive, from a network node, a first message configuring a group of component carriers that includes a primary component carrier and one or more secondary component carriers;
        receive, from the network node, a second message configuring a number of repetitions of a physical uplink control channel (PUCCH) transmission; and
        transmit, to the network node, each repetition of the number of repetitions of the PUCCH transmission via the primary component carrier or a secondary component carrier of the one or more secondary component carriers in accordance with the number of repetitions, each repetition being limited to transmission on the primary component carrier in accordance with the number of repetitions being greater than one, and each repetition being transmitted on either the primary component carrier or the secondary component carrier in accordance with the number of repetitions being equal to one.

7. The UE of claim 6, wherein the first message is a radio resource control (RRC) message.

8. The UE of claim 6, wherein the group of component carriers are associated with a PUCCH carrier switch.

9. The UE of claim 8, wherein execution of the processor-executable code further causes the UE to disable the PUCCH carrier switch in accordance with the number of repetitions being greater than one.

10. The UE of claim 6, wherein at least one component carrier of the group of component carriers is a frequency division duplex (FDD) carrier and at least one component carrier of the group of component carriers is a time division duplex (TDD) carrier.

11. A method of wireless communication performed by a network node, comprising:
    transmitting a first message configuring a group of component carriers that includes a primary component carrier and one or more secondary component carriers;
    transmitting a second message configuring a number of repetitions of a physical uplink control channel (PUCCH) transmission; and
    receiving, from a user equipment (UE), each repetition of the number of repetitions of the PUCCH transmission via the primary component carrier or a secondary component carrier of the one or more secondary component carriers in accordance with the number of repetitions, each repetition being limited to reception on the primary component carrier in accordance with the number of repetitions being greater than one, and each repetition being received on either the primary component carrier or the secondary component carrier in accordance with the number of repetitions being equal to one.

12. The method of claim 11, wherein the first message is a radio resource control (RRC) message.

13. The method of claim 11, wherein the group of component carriers are associated with a PUCCH carrier switch.

14. The method of claim 13, wherein the PUCCH carrier switch is disabled in accordance with the number of repetitions being greater than one.

15. The method of claim 11, wherein at least one component carrier of the group of component carriers is a frequency division duplex (FDD) carrier and at least one component carrier of the group of component carriers is a time division duplex (TDD) carrier.

16. A network node, comprising:
one or more processors; and
one or more memories coupled with the one or more processors and storing processor-executable code that, when executed by the one or more processors, is configured to cause the network node to:
transmit a first message configuring a group of component carriers that includes a primary component carrier and one or more secondary component carriers;
transmit a second message configuring a number of repetitions of a physical uplink control channel (PUCCH) transmission; and
receive, from a user equipment (UE), each repetition of the number of repetitions of the PUCCH transmission via the primary component carrier or a secondary component carrier of the one or more secondary component carriers in accordance with the number of repetitions, each repetition being limited to reception on the primary component carrier in accordance with the number of repetitions being greater than one, and each repetition being received on either the primary component carrier or the secondary component carrier in accordance with the number of repetitions being equal to one.

17. The network node of claim 16, wherein the first message is a radio resource control (RRC) message.

18. The network node of claim 16, wherein the group of component carriers are associated with a PUCCH carrier switch.

19. The network node of claim 18, wherein the PUCCH carrier switch is disabled in accordance with the number of repetitions being greater than one.

20. The network node of claim 16, wherein at least one component carrier of the group of component carriers is a frequency division duplex (FDD) carrier and at least one component carrier of the group of component carriers is a time division duplex (TDD) carrier.

* * * * *